(12) United States Patent
Oguri (10) Patent No.: US 9,725,097 B2
(45) Date of Patent: Aug. 8, 2017

(54) VEHICLE CONTROL DEVICE

(71) Applicant: TOYOTA JIDOSHA KABUSHIKI KAISHA, Toyota-shi, Aichi-ken (JP)

(72) Inventor: Haruki Oguri, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 61 days.

(21) Appl. No.: 14/805,208

(22) Filed: Jul. 21, 2015

(65) Prior Publication Data

US 2016/0090099 A1 Mar. 31, 2016

(30) Foreign Application Priority Data

Sep. 25, 2014 (JP) .................................. 2014-195551

(51) Int. Cl.
*B60W 50/00* (2006.01)
*G09B 29/00* (2006.01)
(Continued)

(52) U.S. Cl.
CPC ........... *B60W 50/00* (2013.01); *G01C 21/367* (2013.01); *G01C 21/3641* (2013.01); *G08G 1/096844* (2013.01); *G08G 1/096861* (2013.01); *G08G 1/22* (2013.01); *G09B 29/00* (2013.01); *B60K 6/00* (2013.01); *B60K 6/46* (2013.01); *B60L 11/123* (2013.01); *B60W 2050/008* (2013.01); *B60W 2050/0089* (2013.01); *G01C 21/00* (2013.01); *G01C 21/28* (2013.01); *G01C 21/30* (2013.01); *G01C 21/34* (2013.01); *G01C 21/3617* (2013.01); *G06N 5/04* (2013.01); *G06N 99/00* (2013.01); *G06Q 10/06* (2013.01);
(Continued)

(58) Field of Classification Search
CPC .... G01C 21/3617; G01C 21/30; G01C 21/00; G01C 21/34; G09B 29/00; G09B 29/10; G08G 1/0112; G08G 1/0962; B60K 37/06; G06F 7/00; G06F 15/18; G10L 21/00; B60W 50/00; G06Q 10/06; G06N 99/00
See application file for complete search history.

(56) References Cited

U.S. PATENT DOCUMENTS

2005/0107946 A1* 5/2005 Shimizu ................. G01C 21/28
701/408
2007/0029121 A1* 2/2007 Saitou ...................... B60K 6/46
180/65.285
(Continued)

FOREIGN PATENT DOCUMENTS

JP 2007-221889 A 8/2007
JP 2013-024679 A 2/2013
(Continued)

*Primary Examiner* — Behrang Badii
(74) *Attorney, Agent, or Firm* — Oliff PLC (57) ABSTRACT

A traveling history learning section circuitry stores learning information based on the traveling history of the vehicle in association with the position of a to-be-learned zone and with the traveling direction of the vehicle in the to-be-learned zone. A learning information obtaining section circuitry obtains learning information corresponding to the position of a host vehicle from the learning information storage section. A display control section circuitry displays a learning status display showing a learning status corresponding to a traveling direction of a host vehicle.

7 Claims, 7 Drawing Sheets

(51) Int. Cl.
*G08G 1/00* (2006.01)
*G08G 1/0968* (2006.01)
*G01C 21/36* (2006.01)
*G01C 21/34* (2006.01)
*G06Q 10/06* (2012.01)
*G06N 99/00* (2010.01)
*B60L 11/12* (2006.01)
*G01C 21/30* (2006.01)
*G06Q 20/20* (2012.01)
*G06N 5/04* (2006.01)
*G06Q 50/30* (2012.01)
*B60K 6/46* (2007.10)
*G01C 21/28* (2006.01)
*G01C 21/00* (2006.01)
*G06Q 20/40* (2012.01)
*B60K 6/00* (2006.01)

(52) U.S. Cl.
CPC ........... *G06Q 20/202* (2013.01); *G06Q 20/40* (2013.01); *G06Q 50/30* (2013.01)

(56) References Cited

U.S. PATENT DOCUMENTS

| | | | |
|---|---|---|---|
| 2009/0005979 A1* | 1/2009 | Nakao | G01C 21/30 701/414 |
| 2013/0158866 A1* | 6/2013 | Weir | G01C 21/3617 701/468 |
| 2014/0195467 A1* | 7/2014 | Yoshizu | G06Q 10/06 706/12 |
| 2015/0120555 A1* | 4/2015 | Jung | G06Q 20/40 705/44 |
| 2015/0134238 A1 | 5/2015 | Kato | |

FOREIGN PATENT DOCUMENTS

JP  2013-237290 A  11/2013
WO  2014002489 A1  1/2014

* cited by examiner

| | Objective point | Entrance point | Traveling direction | Number of times of passing | Number of times of deceleration | Learning progress | · · |
|---|---|---|---|---|---|---|---|
| 35 | $P_{OB}$ | $P_{IN}1$ | East | 10 | 8 | Completion | · · |
| 35 | $P_{OB}$ | $P_{IN}2$ | South | 8 | 5 | Latter half | · · |
| 35 | $P_{OB}$ | $P_{IN}3$ | North | 8 | 7 | Completion | · · |
| 35 | $P_{OB}$ | $P_{IN}4$ | West | 1 | 1 | Beginning | · · |
| | : | : | : | : | : | : | : |

Columns: 35a, 35b, 35c, 35d, 35e, 35f

VEHICLE CONTROL DEVICE

BACKGROUND OF THE DISCLOSURE

The present disclosure relates to a vehicle control device that provides information on driving assistance, and automatic traveling control, which are based on a traveling history that has been learned.

A vehicle control device that performs driving assistance by learning the traveling history of a vehicle has been proposed in recent years. This type of control device sometimes provides information on the driving assistance in accordance with the contents of the driving assistance before controlling the vehicle based on, for example, the traveling history. Likewise, this type of control device sometimes provides information on the driving assistance when prompting a vehicle occupant to perform a predetermined driving operation based on the traveling history.

A device that displays control-pre-notice information that notifies driving assistance control together with road information in advance is known as a device that provides information on driving assistance (see Japanese Laid-Open Patent Publication No. 2013-237290, for example). This device stores learning information that includes pedal depression information of, for example, an accelerator pedal and a brake pedal. Based on the learning information, this device divides an area in which a host vehicle is traveling into a not-yet-learned zone, an already-learned and non-automatic zone, and distinguishably displays the divided zones on, for example, a display screen. Additionally, when needed, operation advice, such as "Accelerator Off", is displayed in addition to displaying those zones.

Even in one zone to be learned, there is a case in which learning situations will also be different from each other if the traveling direction in the zone is different. However, the aforementioned device does not take into consideration the fact that the vehicle occupant is provided with information on a learning situation according to the traveling direction of the vehicle, and hence the aforementioned device leaves room to improve an information providing function serving as that of a device that performs the driving assistance and the automatic traveling control, of the vehicle based on a learned traveling history.

An objective of the present disclosure is to more appropriately provide a vehicle occupant with information on situations of learning in accordance with the traveling direction of a vehicle.

SUMMARY

In accordance with one aspect of the present disclosure, a vehicle control device is provided that is configured to provide information to a vehicle occupant by storing a learning result of a traveling history of a vehicle in a learning information storage section circuitry and by displaying a learning status on a display. The vehicle control device includes a traveling history learning section circuitry, a learning information obtaining section circuitry, and a display control section circuitry. The traveling history learning section circuitry is configured to store learning information based on the traveling history of the vehicle in the learning information storage section circuitry in association with a position of a to-be-learned zone and with a traveling direction of the vehicle in the to-be-learned zone. The learning information obtaining section circuitry is configured to obtain, from the learning information storage section circuitry, learning information corresponding to a position of a host vehicle. The display control section circuitry is configured to display, on the display, a learning status display showing a learning status corresponding to a traveling direction of the host vehicle.

According to the aforementioned configuration, learning information based on a traveling history is stored in association with the traveling direction of the vehicle, and a learning status display showing a learning status corresponding to the traveling direction is displayed on the display. Therefore, it is possible to provide information on the learning status according to the traveling direction of the host vehicle to the vehicle occupant more appropriately.

In the vehicle control device, the display control section is preferably configured to display, on the display, only the learning status display showing the learning status corresponding to the traveling direction of the host vehicle.

According to the aforementioned configuration, only a learning status display corresponding to the traveling direction of the host vehicle is displayed, for example, even if learning statuses in different traveling directions are correlated with one zone or one point. Therefore, it is possible for the vehicle occupant to easily recognize information on the learning status according to the traveling direction of the host vehicle.

In the vehicle control device, the display control section circuitry is preferably configured to display, on the display, the learning status display corresponding to the traveling direction of the host vehicle in a display manner different from learning status displays showing learning statuses corresponding to other different traveling directions.

According to the aforementioned configuration, a learning status display corresponding to the traveling direction of the host vehicle is displayed in a display manner different from a learning status display showing a learning status corresponding to another different traveling direction, for example, even if learning statuses in different traveling directions are correlated with one zone or one point. Therefore, for example, even when information on a plurality of learning statuses is provided, it is possible for the vehicle occupant to easily recognize information on a learning status according to the traveling direction of the host vehicle.

The above described vehicle control device preferably includes a learning status determination section circuitry configured to determine a learning status of the to-be-learned zone based on the obtained learning information. In this case, the learning status determination section circuitry is configured to calculate a frequency of a predetermined traveling state in the to-be-learned zone by use of learning information corresponding to the position and the traveling direction of the host vehicle and to determine learning progress based on the frequency. The display control section circuitry is configured to display the learning status display corresponding to the traveling direction of the host vehicle when the determined learning progress has reached predetermined progress.

In the aforementioned configuration, when learning progress corresponding to the traveling direction of the host vehicle reaches predetermined progress, a learning status display corresponding to the traveling direction of the host vehicle is displayed. Therefore, it is possible for the vehicle occupant to easily comprehend a zone or a point that corresponds to the traveling direction of the host vehicle and whose learning progress is equal to the predetermined progress or more.

The above described vehicle control device preferably includes a route search section circuitry configured to search for a route from a departure place to a destination. In this case, the learning information obtaining section circuitry is configured to obtain learning information on a searched route and in a traveling direction from the departure place toward the destination. The display control section circuitry is configured to display, on the display, the learning status display of the route retrieved based on the obtained learning information.

In the aforementioned configuration, when a route to a destination is set, only a learning status display on a searched route is displayed. Therefore, it is possible for the vehicle occupant to easily recognize a learning status of a to-be-learned zone related to the route.

In the above described vehicle control device, the display control section circuitry is preferably configured to display the learning status display corresponding to the traveling direction of the host vehicle under at least one of the condition that i) the host vehicle has entered the to-be-learned zone and the condition that ii) a relative distance between the position of the host vehicle and the to-be-learned zone has become equal to or less than a predetermined distance.

In the aforementioned configuration, when the host vehicle enters a to-be-learned zone or when the relative distance between the host vehicle and the to-be-learned zone becomes a predetermined distance or less, the learning status display corresponding to the traveling direction is displayed. Therefore, it is possible for the vehicle occupant to easily recognize the association between the traveling direction and the learning status display.

In the above described vehicle control device, the display control section circuitry is preferably configured to bring the learning status display into a non-display state under the condition that the host vehicle has left the to-be-learned zone.

In the aforementioned configuration, the learning status display is brought into a non-display state when the host vehicle leaves from the to-be-learned zone. This also makes it possible for the vehicle occupant to easily recognize the association between the traveling direction and the learning status display.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DESCRIPTION OF THE PREFERRED EMBODIMENTS

A vehicle control device according to one embodiment will now be described.

Figure 1:
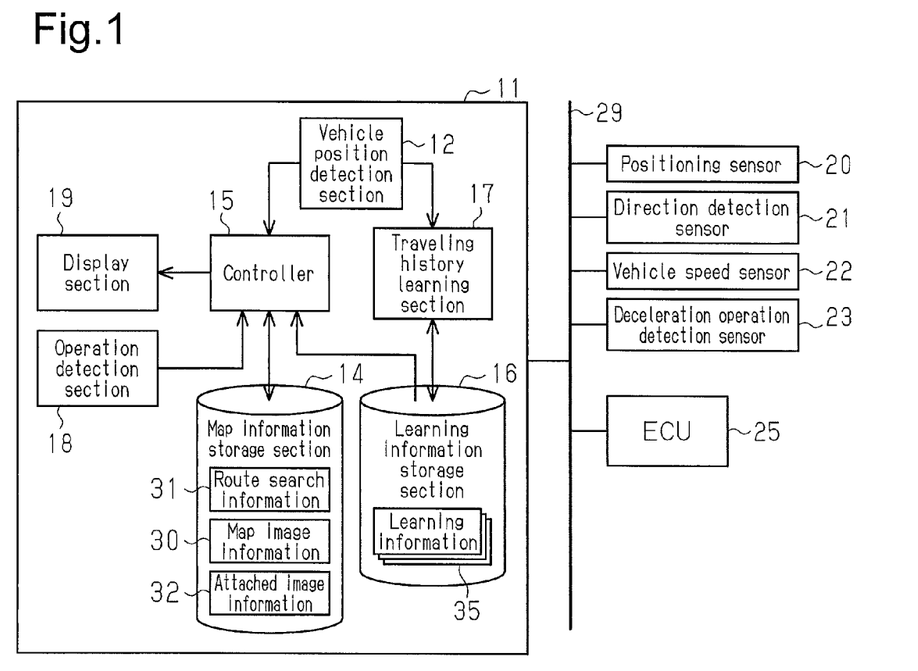
FIG. 1 is a block diagram showing a configuration of a part of a vehicle that includes a vehicle control device according to one embodiment according to the present disclosure.

As shown in FIG. 1, a navigation device 11 is connected to a positioning sensor 20, which receives signals from a satellite positioning system, such as a global positioning system (GPS), and is connected to a direction detection sensor 21, such as a gyroscope, and is connected to a vehicle speed sensor 22 through an in-vehicle network 29.

The navigation device 11 includes a vehicle position detection section 12, which detects a vehicle position at which the host vehicle is located. The vehicle position detection section 12 identifies the vehicle position based on positioning data received from the positioning sensor 20, vehicle speed data received from the vehicle speed sensor 22, and direction data received from the direction detection sensor 21. The vehicle position detection section 12 outputs the identified vehicle position to a controller 15 of the navigation device 11.

The navigation device 11 includes a display 19. For example, the display 19 is a display arranged near the driver's seat, or is a head-up display arranged on the windshield or otherwise near the driver's seat. Various views to provide information to vehicle occupants are output to the display 19 by means of the controller 15.

The controller 15 includes an arithmetic unit and a storage device and reads out map image information 30 on an area around the position of the vehicle or on an area specified by a vehicle occupant from a map information storage section 14, and then outputs it to the display 19. Therefore, a map image is displayed on the display 19. The map image information 30 is image information for drawing a map image, and is divided into predetermined areas, each of which is correlated with, for example, latitude/longitude. The map information storage section 14 is composed of a circuitry, for example.

Route search information 31 and attached image information 32, in addition to the map image information 30, are stored in the map information storage section 14. The route search information 31 is information for searching for a route from a departure place to a destination, and has road attribute information on the running direction, the number of traffic lanes, and the type of the road in addition to link data and node data. The attached image information 32 is image information such as icons displayed and superimposed on the map image.

The navigation device 11 additionally includes an operation detection section 18, which detects input operations performed by a vehicle occupant. The operation detection section 18 has, for example, an operating switch and a sensor that detects a press on the operating switch. If the display 19 is a touch panel display, the operation detection section 18 has a detection sensor that detects a contact position between the screen of the display 19 and a finger of the vehicle occupant. Destination setting, route selection, and other operations are performed by allowing the vehicle occupant to apply input operations to the operating portion of the operation detecting section 18.

The navigation device 11 has a function that learns the traveling history of the host vehicle. The contents of learning include a zone in which deceleration, which is a predetermined traveling state, has occurred and the learning of how many times deceleration has occurred in the zone. The frequency of deceleration is learned in each zone. As a result, driving assistance to restrain the acceleration of the host vehicle is performed in, for example, a zone in which the frequency of deceleration is high, and it is possible to improve energy efficiency, such as fuel efficiency, or is possible to prevent abrupt stopping.

Driving assistance based on a traveling history is performed by cooperation between the navigation device 11 and an electronic control unit (ECU) 25 connected to the navigation device 11 through the in-vehicle network 29. Based on learning information 35 stored in the learning information storage portion 16, the navigation device 11 transmits data showing whether driving assistance based on learning is in an executable state to the ECU 25. The ECU 25 is, for example, a hybrid ECU, which determines the power distribution of the engine and the motor, or an ECU that controls braking force.

The traveling history of the host vehicle is obtained by a traveling history learning section 17 of the navigation device 11. The obtained traveling history is stored in the learning information storage portion 16 as a piece of learning information 35. The traveling history learning section 17 is composed of a circuitry, for example.

The traveling history learning section 17 detects the vehicle position from the vehicle position detection section 12, and inputs deceleration detection data from a deceleration operation detection sensor 23 connected thereto through the in-vehicle network 29. The deceleration operation detection sensor 23 detects the deceleration of the host vehicle, and detects the operational amount of, for example, the brake pedal. In this case, the deceleration detection data includes, at least, data showing the on/off of the brake pedal. Alternatively, the deceleration operation detection sensor 23 may be an acceleration/deceleration sensor that detects an acceleration state and a deceleration state of the vehicle. In this case, the deceleration detection data includes the acceleration and the deceleration of the vehicle. The traveling history learning section 17 stores the position of a predetermined to-be-learned zone and the learning information 35, which includes information on deceleration in this to-be-learned zone in the learning information storage portion 16.

Next, to-be-learned zones will be described with reference to FIG. 2. The to-be-learned zone Z is a zone having a predetermined distance from an entrance point $P_{IN}$ to an objective point $P_{OB}$. The objective point $P_{OB}$ is set at a plurality of points of the road. The to-be-learned zone Z is preset with respect to the road.

The objective point $P_{OB}$ is, for example, a point at which a driving action to be learned is predicted to be ended or is started, and the objective point $P_{OB}$ is set in accordance with the contents of driving assistance. If what is to be learned is a deceleration action, the objective point $P_{OB}$ is, for example, a point at which a series of deceleration actions of the vehicle are predicted to be ended. In this case, the point at which the objective point $P_{OB}$ is set is, for example, an intersecting point or a diverging point at which the vehicle waits for a traffic light or is stopped temporarily, and yet the point may be an end point of a sharp turn or a like point if deceleration is ended at this point. The "deceleration action" mentioned here includes not only a one-time vehicle deceleration action but also an action in which deceleration is performed a plurality of times. The entrance point $P_{IN}$ is a point that is set to be a predetermined distance (for example, several hundred meters) short of the objective point $P_{OB}$.

Ordinarily, a plurality of to-be-learned zones Z that differ from each other in the traveling direction with respect to one objective point $P_{OB}$ is set. The number of the to-be-learned zones Z is appropriately set in accordance with, for example, the number of traffic lanes of an objective point $P_{OB}$, a road type, and the presence or absence of a traffic light.

Figure 2:
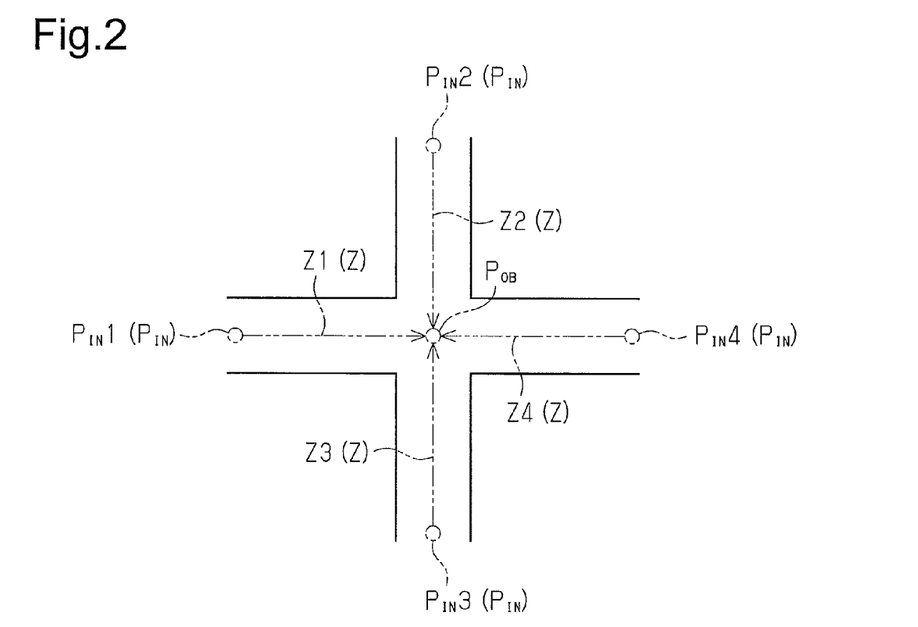
FIG. 2 is a plan view describing a to-be-learned zone that is learned by the vehicle control device of FIG. 1.

In an example shown in FIG. 2, entrance points $P_{IN}1$ to $P_{IN}4$ and to-be-learned zones Z1 to Z4 are set in association with four traveling directions facing a single objective point $P_{OB}$. The to-be-learned zones Z1 to Z4 are zones from the entrance points $P_{IN}1$ to $P_{IN}4$ to the objective point $P_{OB}$, respectively. Hereinafter, when the to-be-learned zones Z1 to Z4 are described without making a distinction therebetween, each of the to-be-learned zones Z1 to Z4 is described as a to-be-learned zone Z. When the entrance points $P_{IN}1$ to $P_{IN}4$ are described without making a distinction therebetween, each of the entrance points $P_{IN}1$ to $P_{IN}4$ is described as an entrance point $P_{IN}$.

Figure 3:
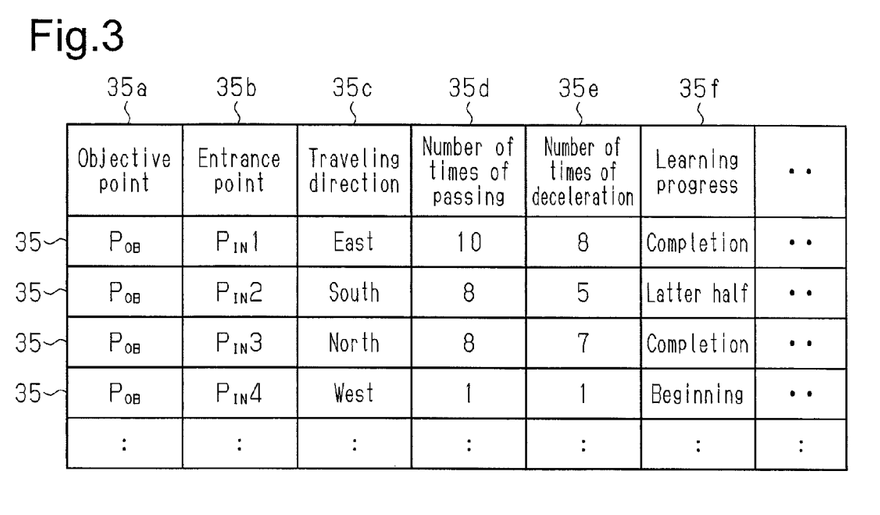
FIG. 3 is a table describing a configuration of a part of learning information that is learned by the vehicle control device of FIG. 1.

Next, one example of a configuration of the learning information 35 will be described with reference to FIG. 3.

The learning information 35 is created for each of the to-be-learned zones Z, and includes an objective point 35*a*, an entrance point 35*b*, a traveling direction 35*c*, a number of times of passing 35*d*, a number of times of deceleration 35*e*, and learning progress 35*f*.

The objective point 35*a* shows the position, such as latitude/longitude, of an objective point $P_{OB}$ of a to-be-learned zone, and the entrance point 35*b* shows the position, such as latitude/longitude, of an entrance point $P_{IN}$ of a to-be-learned zone.

The number of times of passing 35*d* shows the number of times the host vehicle passes through a to-be-learned zone Z with which the learning information 35 is correlated. The number of times of deceleration 35*e* shows a passing frequency in which deceleration occurs at least one time in a to-be-learned zone Z. In other words, when the host vehicle passes through this to-be-learned zone Z, "one time" is added to the number of times of deceleration 35*e* if deceleration is performed at least one time. The number of times of deceleration 35*e* may be the number of times the host vehicle decelerates during passage through this to-be-learned zone Z. In this case, when the host vehicle passes through this to-be-learned zone Z, "two times" is added to the number of times of deceleration 35*e* if the vehicle decelerates two times.

The learning progress 35*f* is determined based on the number of times of deceleration. The learning progress is divided into, for example, five stages consisting of "No deceleration", "Beginning", "First half", "Latter half", and "Completion". The learning progress is not necessarily required to be divided into five stages, and it is only necessary to divide the learning progress into two or more stages.

The initial value of the learning progress is preset at "No deceleration." When deceleration is performed in a to-be-learned zone Z only once, the learning progress 35*f* is set at "Beginning". If deceleration occurs more than a predetermined number of times, such as two times, in a to-be-learned zone Z, the learning progress is set in accordance with the frequency of deceleration as follows. The rate of occurrence of deceleration shows the ratio of the number of times of deceleration 35*e* with respect to the number of times of passing 35*d*, and a first threshold value R1 is smaller than a second threshold value R2.

"First half" . . . Deceleration in a to-be-learned zone is performed more than a predetermined number of times, and the rate of occurrence of deceleration is less than the first threshold value R1.

"Latter half" . . . Deceleration in a to-be-learned zone is performed more than a predetermined number of times, and the rate of occurrence of deceleration is the first threshold value R1 or more and is less than the second threshold value R2.

"Completion" . . . Deceleration in a to-be-learned zone is performed more than a predetermined number of times, and the rate of occurrence of deceleration is the second threshold value R2 or more.

A state in which the learning progress is "Completion" is equivalent to a state in which learning in a to-be-learned zone Z has matured and driving assistance based on a traveling history is viable. When the host vehicle enters a to-be-learned zone Z, the controller 15 transmits data showing that driving assistance is in a viable state to the ECU 25, which performs driving assistance. The ECU 25 receives this data, and then finally determines whether driving assistance is viable or not, and performs driving assistance in accordance with a result obtained by this determination.

Next, display patterns of an objective point $P_{OB}$ to a map image will be described with reference to FIG. 4 to FIG. 6.

Figure 4:
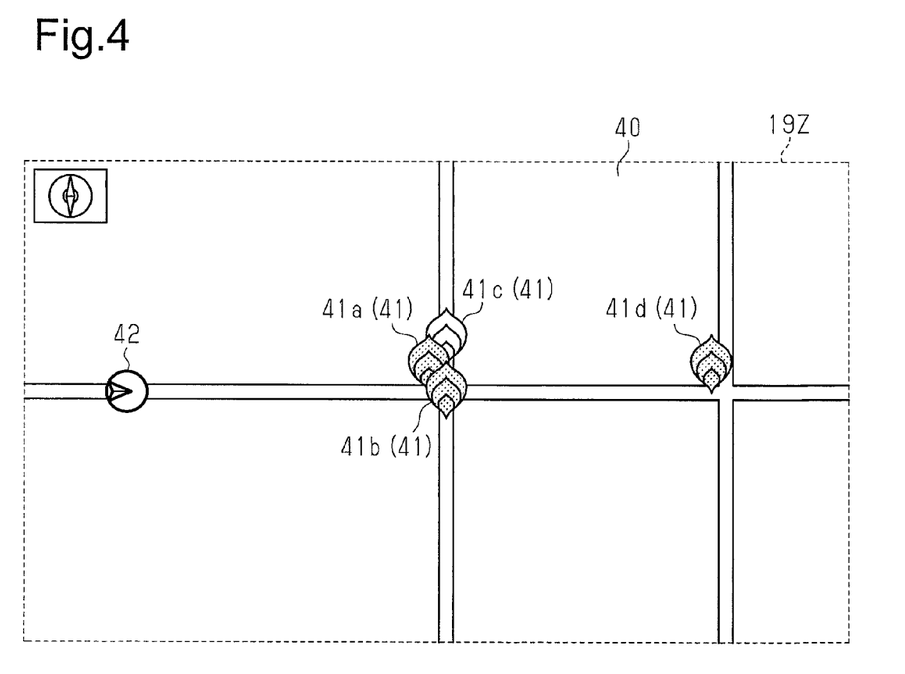
FIG. 4 is a diagram showing a learning status display that is provided by the vehicle control device of FIG. 1 before the vehicle enters a to-be-learned zone.

As shown in FIG. 4, a map image 40, which serves as a base image, is displayed in an image display area 19Z of the display 19. The map image 40 is an image based on the map image information 30 shown in FIG. 1, and is a map image of a certain area drawn two-dimensionally. A learning status display 41 showing the learning progress of a to-be-learned zone Z including an objective point $P_{OB}$ is displayed in the form of an icon based on the attached image information 32 shown in FIG. 1 at a position corresponding to the objective point $P_{OB}$ in the map image 40. The learning status display 41 is displayed only when the learning progress is "Latter half" and "Completion". In other words, when the learning progress is "No deceleration", "Beginning", or "First half", the learning status display 41 is not displayed. The learning status display 41 corresponds to one traveling direction with respect to an objective point $P_{OB}$, and is displayed at a position deviated from the center of the objective point $P_{OB}$ toward an entrance point $P_{IN}$ of a corresponding to-be-learned zone Z. Therefore, a plurality of learning status displays 41 are displayed in an overlapped state while being slightly deviated from each other.

When the vehicle position is included in the image display area 19Z of this map image 40, a vehicle position display 42 showing the vehicle position is superimposed and displayed. Attached image information 32 to draw icons that differ from each other in accordance with learning progress is stored in the map information storage section 14. Before the host vehicle enters a single to-be-learned zone Z, learning status displays 41 corresponding to an objective point $P_{OB}$ are displayed in a state in which colors, patterns, and the like differ from each other in accordance with the learning progress of the to-be-learned zone Z. In FIG. 4, the learning status display 41*a* corresponding to the traveling direction from the left side toward the right side shows that the learning progress is "Completion". Likewise, in FIG. 4, the learning status display 41*b* corresponding to the traveling direction from the lower side toward the upper side shows that the learning progress is "Completion". The learning status display 41*c* from the upper side toward the lower side shows that the learning progress is "Latter half". In FIG. 4, the learning progress corresponding to the traveling direction from the right side to the left side is "No deceleration", "Beginning", or "First half", and hence is not displayed.

Figure 5:
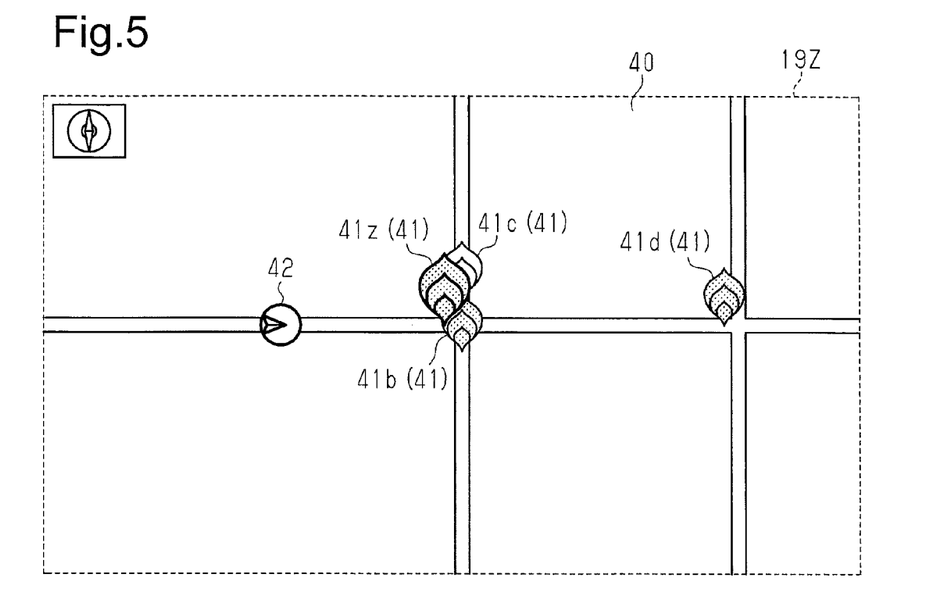
FIG. 5 is a diagram showing a learning status display that is provided by the vehicle control device of FIG. 1 after the vehicle enters the to-be-learned zone of FIG. 4.

As shown in FIG. 5, if the learning status display 41*a* corresponding to a to-be-learned zone Z corresponds to "Completion" when the host vehicle enters this to-be-learned zone Z, the learning status display 41*a* is displayed differently from the learning status display 41 showing ordinary learning progress based on new attached image information 32. Therefore, the learning status display 41*a* is changed to a highlighted display 41*z*, which is a relatively more prominent than the other learning status displays 41. For example, also in the learning status display 41*b* in the traveling direction from the lower side to the upper side in FIG. 5, the learning progress is "Completion", and yet only the learning status display 41*a* corresponding to the traveling direction of the host vehicle is made prominent as a highlighted display 41*z*. When the host vehicle passes through the objective point $P_{OB}$, all the learning status displays 41 are brought into a non-display state.

Examples of possible methods that can be mentioned as methods for making a highlighted display include, among the plurality of learning status displays 41 displayed in an overlapped state, displaying the highlighted display 41*z* more frontally than the other learning status displays 41, displaying the size of the highlighted display 41*z* larger than the other learning status displays 41, and changing the color, pattern, and the like of the highlighted display 41*z*.

Thus, if the learning progress corresponding to the traveling direction has reached "Completion", which is predetermined learning progress, when the host vehicle enters the to-be-learned zone Z, the learning status display 41 is highlighted. Therefore, it is possible for a vehicle occupant to beforehand comprehend the possibility that driving assistance will be performed anteriorly in the traveling direction. When driving assistance is performed, the zone in which the vehicle is traveling is a zone in which learning has been completed and in which the conditions for driving assistance are satisfied. Therefore, it is possible to recognize that driving assistance is performed. On the other hand, when the learning status display 41 is not highlighted, the zone is a zone in which learning has not yet been completed. Therefore, it is possible to recognize that driving assistance is not performed.

When the host vehicle enters a to-be-learned zone Z, the learning status display 41 may be highlighted, and a vehicle occupant may be prompted to perform a predetermined driving operation by outputting a voice, such as "Accelerator Off" from, for example, a speaker (not shown). An icon or the like to prompt the vehicle occupant to perform a predetermined driving operation may be superimposed on the map image 40. Even in this case, it is possible for the vehicle occupant to recognize those voice and display that are correlated with the learning status.

Figure 6:
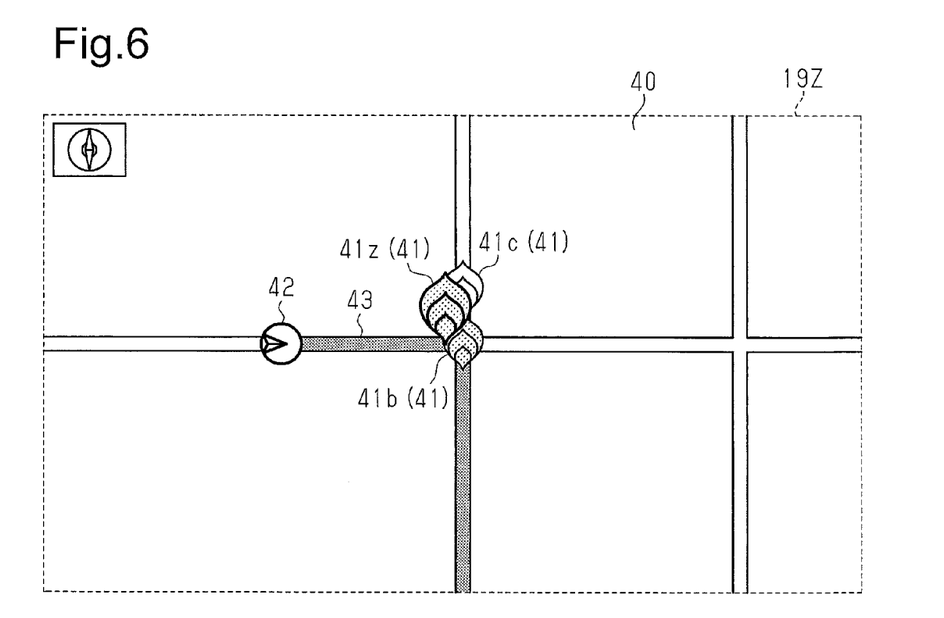
FIG. 6 is a diagram describing a learning status display that is provided by the vehicle control device of FIG. 1 when a route is set.

As shown in FIG. 6, a route display 43, which is to guide a route, is displayed in a state in which a road on the map is highlighted when routes from a departure place to a destination are searched by the controller 15 based on a single or a plurality of conditions and when one of the searched routes is set by the vehicle occupant. When the route is set in this way, only the learning status display 41 that corresponds to the traveling direction along the route and on the route is displayed. Therefore, it is possible for the vehicle occupant to comprehend a zone in which there is a possibility that driving assistance will be performed in the route. The learning status display 41d (see FIG. 5) correlated with roads other than the route is not displayed, and the number of learning status displays 41 displayed thereon is lessened. Therefore, it is easy for the vehicle occupant to recognize a learning status on the route.

Figure 7:
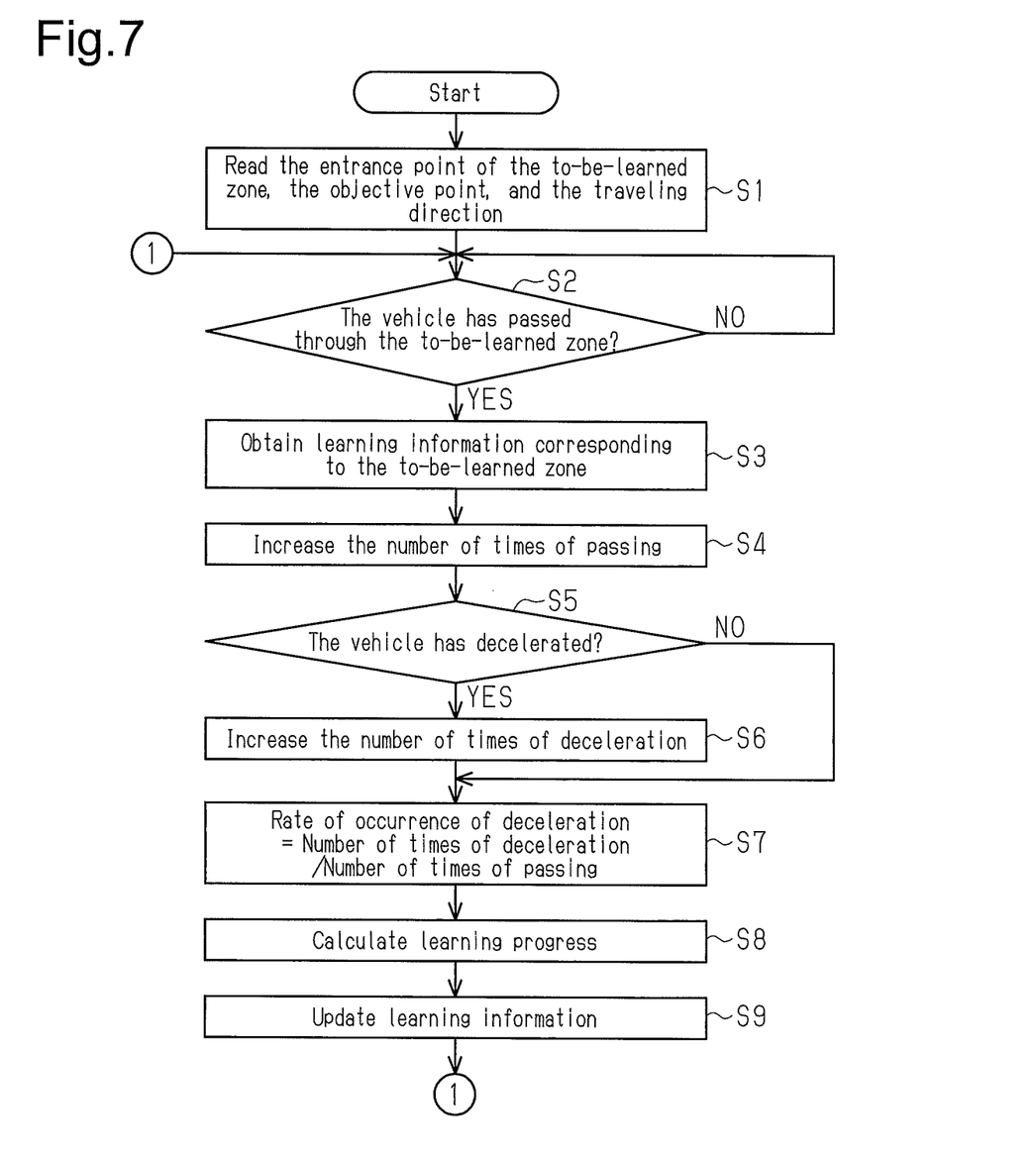
FIG. 7 is a flowchart showing a learning operation performed by the vehicle control device of FIG. 1.

Next, with reference to FIG. 7, the operation of the traveling history learning section 17 will be described along steps of learning a traveling history. The learning of the traveling history is started when learning starting conditions, such as the start of the navigation device 11, are satisfied, and is repeatedly performed until learning ending conditions, such as the shutdown of the navigation device 11, are satisfied.

When the learning of a traveling history is started, the traveling history learning section 17 reads an entrance point $P_{IN}$ of a to-be-learned zone Z in a predetermined area, the position of an objective point $P_{OB}$, a traveling direction, and the like from learning information 35 or from data concerning the to-be-learned zone Z (step S1). The traveling history learning section 17 obtains the vehicle position and the traveling direction from the vehicle position detection section 12, and determines whether the host vehicle has passed through the to-be-learned zone Z from the entrance point $P_{IN}$ toward the objective point $P_{OB}$ (step S2). In a period until the host vehicle passes through the objective point $P_{OB}$ after passing through the entrance point $P_{IN}$, the traveling history learning section 17 determines whether the host vehicle has decelerated based on deceleration detection data that has been input from the deceleration operation detection sensor 23. For example, a deceleration detection flag is brought into an ON state if the vehicle has decelerated.

If the traveling history learning section 17 determines that the vehicle has passed through the to-be-learned zone Z (step S2: YES), the traveling history learning section 17 obtains learning information 35 corresponding to the to-be-learned zone Z (step S3). The traveling history learning section 17 increments the number of times of passing 35d included in the obtained learning information 35 (step S4).

Furthermore, the traveling history learning section 17 reads a deceleration detection flag and determines whether the host vehicle has decelerated in the to-be-learned zone (step S5). If it is determined that the vehicle has decelerated (step S5: YES), the traveling history learning section 17 increments the number of times of deceleration 35e (step S6). When the number of times of deceleration in the to-be-learned zone Z is counted, a counter variable or the like to count the deceleration detection frequency is used. The value of the counter variable is added to the number of times of deceleration 35e.

The traveling history learning section 17 calculates the rate of occurrence of deceleration R by dividing the number of times of deceleration 35e by the number of times of passing 35d (step S7). The traveling history learning section 17 updates the learning progress 35f of the learning information 35 to learning progress 35f, which is any one of the aforementioned five stages, that corresponds to the calculated rate of occurrence of deceleration R (step S8).

The traveling history learning section 17 updates the learning information 35 by use of the number of times of passing 35d calculated in this way, the number of times of deceleration 35e, and the learning progress 35f (step S9). When the vehicle passes through the single to-be-learned zone Z, the process returns to step S2, and the passing through the following to-be-learned zone is awaited.

Figure 8:
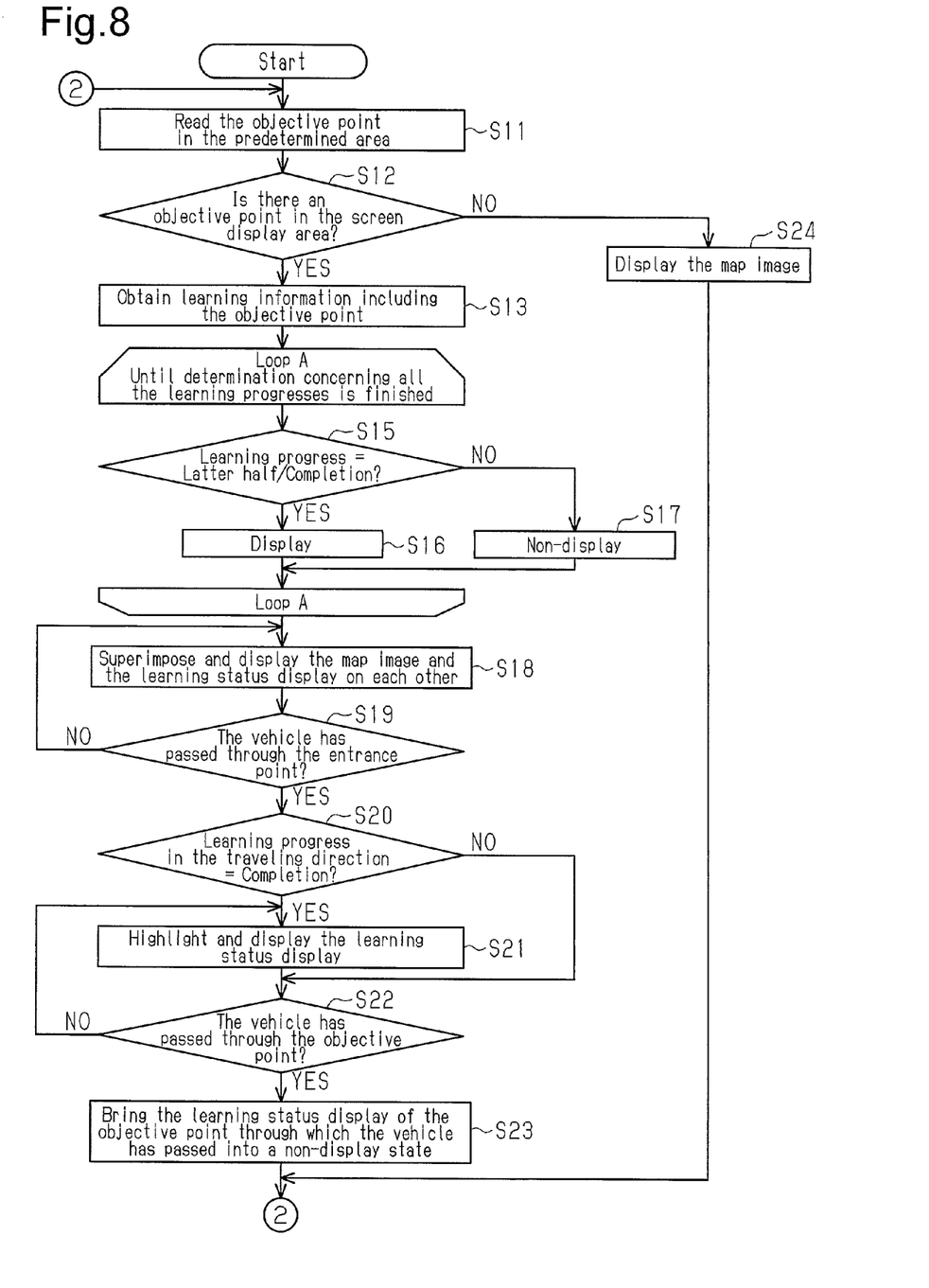
FIG. 8 is a flowchart showing a display operation of a learning status display performed by the vehicle control device of FIG. 1.

Next, with reference to FIG. 8, the operation of the controller 15 will be described along with the procedure of an image display that uses the learning information 35. An image display that uses the learning information 35 is started when display starting conditions, such as the start-up of the navigation device 11, are satisfied, and is repeatedly performed until display ending conditions, such as the shutdown of the navigation device 11, are satisfied. This image display is performed in parallel with the learning of a traveling history.

When the image display starting conditions are satisfied, the controller 15 obtains the vehicle position and the traveling direction from the vehicle position detection section 12, and reads the position of an objective point $P_{OB}$ in a predetermined area (step S11). An area in which the objective point $P_{OB}$ is to be read may be, for example, a whole area in which the map image information 30 is capable of being displayed or an area falling within a predetermined range that centers on the vehicle position. The area in which the objective point $P_{OB}$ is to be read may be a route from a departure place to a destination.

The controller 15 reads the objective point $P_{OB}$ in the predetermined area, and then determines whether the objective point $P_{OB}$ is present in the image display area 19Z where the map image is displayed (step S12). If it is determined that the objective point $P_{OB}$ is not present in the image display area 19Z (step S12: NO), the controller 15 reads out map image information 30 on the surrounding area of the vehicle position or on an area specified by the operation of the vehicle occupant from the map information storage section 14, and allows the display 19 to display a map image 40 (step S24).

If the controller 15 determines that the objective point $P_{OB}$ is present in the image display area 19Z (step S12: YES), learning information 35 corresponding to the objective point $P_{OB}$ is obtained (step S13). Ordinarily, the learning information 35 is a plurality of pieces of learning information including one objective point $P_{OB}$. Therefore, all of those pieces of learning information 35 are read. If a plurality of objective points $P_{OB}$ is present in the image display area 19Z, pieces of learning information 35 each of which corresponds to each of the objective points $P_{OB}$ are read.

The controller 15 reads learning progress 35f for each of the different traveling directions toward the objective point $P_{OB}$ from the thus obtained learning information 35. Determination whether to display the learning progress 35f that has been read is performed until a determination concerning all the learning progresses capable of being displayed in the image display area 19Z is finished (loop A).

In other words, the controller 15 determines whether each one among the learning progresses 35f that have been read is "Latter half" or "Completion" (step S15). If the learning progress is "Latter half" or "Completion" (step S15: YES), it is determined that the learning progress is displayed as a learning status display 41 (step S16). If the learning progress is any one of "No deceleration", "Beginning", and "First half" (step S15: NO), it is determined that this learning progress is not displayed (step S17).

Determination whether each of all the learning progresses 35f is displayed or not is made, and then the controller 15 displays the map image 40 and the learning status display 41 determined to be displayed that are superimposed on each other by use of the map image information 30 and the attached image information 32 (step S18).

While continuously displaying the map image 40 and the learning status display 41, the controller 15 determines whether the host vehicle has passed through the entrance point $P_{IN}$ in the image display area 19Z of the map image based on the vehicle position and the traveling direction (step S19). The map image 40 and the learning status display 41 are continuously displayed until the host vehicle passes through the entrance point $P_{IN}$ (step S18). If the map image 40 displayed in the image display area 19Z is changed, the process returns to step S12, and the aforementioned steps are repeatedly performed.

If the controller 15 determines that the host vehicle has passed through the entrance point $P_{IN}$ (step S19: YES), the controller 15 determines whether the learning progress in the traveling direction of the host vehicle among the learning progresses of the objective point $P_{OB}$ correlated with the entrance point $P_{IN}$ is "Completion" (step S20).

If the controller 15 determines that the learning progress in the traveling direction of the host vehicle is "Completion" (step S20: YES), a learning status display 41 corresponding to the traveling direction is highlighted (step S21). In other words, a change is made from the learning status display 41 showing the ordinary "Completion" to the highlighted display 41z.

When the host vehicle passes through the entrance point $P_{IN}$ or when the host vehicle passes through a point that is short of the entrance point $P_{IN}$ and that is at a predetermined distance that is a relative distance with respect to the entrance point $P_{IN}$, the controller 15 transmits data showing that driving assistance is in an executable state to the ECU 25 based on the learning progress of the objective point $P_{OB}$ corresponding to the traveling direction. The ECU 25 receives this data from the navigation device 11, and then determines that driving assistance is in an executable state, and finally determines whether to perform driving assistance based on, for example, other pieces of data received through the in-vehicle network 29.

The learning status display 41 is continuously highlighted until the host vehicle passes through the objective point $P_{OB}$ (step S21). While the learning status display 41 is being highlighted in this way, driving assistance is performed depending on the situation. If the controller 15 determines that the host vehicle has passed through the objective point $P_{OB}$ (step S22: YES), the learning status display 41 of the objective point $P_{OB}$ through which the vehicle has passed is brought into a non-display state (step S23), and then the process returns to step S11, and the aforementioned steps are repeatedly performed.

As described above, the learning status display 41 shows not a predetermined zone in the map image 40 but an objective point $P_{OB}$. Therefore, even if the learning status display 41 is simultaneously displayed on one screen along with, for example, a belt-shaped zone display showing a traffic congestion zone or along with a route display showing a route to a destination, it is possible to easily discriminate between these displays. Therefore, it is possible for the vehicle occupant to easily distinguish the learning status display 41 from others even when the amount of information provided to the vehicle occupant is comparatively large in one screen.

When a plurality of learning status displays 41 are displayed at the objective point $P_{OB}$ of the map image 40, these learning status displays 41 are overlapped with each other, and yet it is possible for the vehicle occupant to easily recognize the association between the traveling direction of the host vehicle and the highlighted display 41z by highlighting only the learning status display 41 corresponding to the traveling direction of the host vehicle. Additionally, the learning status display 41 of "Completion" showing that learning progress has matured and the learning status display 41 of "Latter half" showing that learning progress is approaching "Completion" among the learning statuses are displayed. Thus, it is possible to set the number of icons displayed on the map image 40 at the minimum necessary. Therefore, it is possible for the vehicle occupant to easily recognize information provided through the display 19.

The above described embodiment achieves the following advantages.

(1) Learning information 35 based on a traveling history is stored in the navigation device 11 in association with the traveling direction of the vehicle, and a learning status display 41 showing a learning status corresponding to the traveling direction is displayed on the display 19. Therefore, it is possible to provide information on the learning status according to the traveling direction of the host vehicle to the vehicle occupant more appropriately.

(2) The learning status display 41 corresponding to the traveling direction of the host vehicle is displayed as a display differing from learning status displays 41 that show learning statuses in other different traveling directions. Therefore, even if learning statuses in different traveling directions are correlated with one objective point $P_{OB}$, a learning status display 41 corresponding to the traveling direction is highlighted, and is displayed in a manner differing from learning status displays 41 in the other traveling directions. Therefore, for example, even when information on a plurality of learning statuses is provided, it is possible for the vehicle occupant to easily recognize information on a learning status according to the traveling direction of the host vehicle.

(3) When learning progress corresponding to the traveling direction of the host vehicle reaches predetermined progress, a learning status display 41 corresponding to the traveling direction of the host vehicle is displayed in a manner differing from learning status displays 41 that show learning statuses in other different traveling directions. Therefore, it is possible for the vehicle occupant to easily comprehend a point that corresponds to the traveling direction of the host vehicle and whose learning progress is "Completion".

(4) When a route to a destination is set, only the learning status display 41 on the searched route is displayed. Therefore, it is possible for the vehicle occupant to easily recognize a learning status of a to-be-learned zone Z related to the route.

(5) When the host vehicle enters a to-be-learned zone Z, the learning status display 41 corresponding to the traveling direction thereof is highlighted. Therefore, it is possible for the vehicle occupant to easily recognize the association between the traveling direction and the learning status display.

(6) The learning status display 41 is brought into a non-display state when the host vehicle leaves from a to-be-learned zone Z. This also makes it possible for the vehicle occupant to easily recognize the association between the traveling direction and the learning status display.

Each of the aforementioned embodiments may also be carried out in the following modes.

The learning status display 41 corresponding to the traveling direction of the host vehicle may be highlighted by bringing the display into a dynamic display state, such as a state in which an icon is blinked or a state in which a color is changed with predetermined periods.

Figure 9:
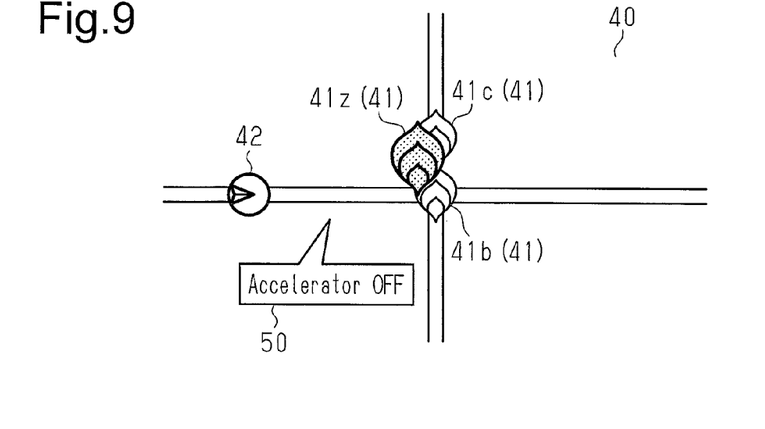
FIG. 9 is a diagram describing a display example of a learning status display performed by a vehicle control device of a modification.

As shown in FIG. 9, the learning status display 41 may be displayed on the map image 40, and an instruction display 50, which prompts the vehicle occupant to perform a predetermined driving operation, may be displayed at a position in a to-be-learned zone corresponding to the traveling direction of the host vehicle. In this case, it is possible for the vehicle occupant to easily recognize the association between the instruction display 50 and the learning status display 41, and it is possible for the vehicle occupant to comprehend that the instruction display 50 has been displayed so that the learning progress satisfies conditions for driving assistance.

Although the learning status display 41 corresponding to the traveling direction of the host vehicle is highlighted when the host vehicle enters a to-be-learned zone in the aforementioned embodiment, the learning status display 41 corresponding to the traveling direction of the host vehicle may be highlighted on the condition that a relative distance between the host vehicle and the entrance point of the to-be-learned zone has become a predetermined distance or less.

Although a zone (or a point) having the possibility that driving assistance will be performed is shown by highlighting the learning status display 41 in the aforementioned embodiment, a zone or a point having the possibility that operations other than driving assistance will be performed may be shown. A zone or a point for which point information, such as the occurrence frequency of traffic congestion or an advice about a driving operation, is provided may be shown.

Although to-be-learned zones are set beforehand in the aforementioned embodiment, those may be set by the traveling history learning section 17. For example, a zone in which the number of times of passing and the number of times of deceleration are large may be set as a to-be-learned zone. A to-be-learned zone may be set along a highway in an area in which the number of times of passing is large.

It is possible to change the objective point in accordance with the contents of driving assistance. For example, if energy efficiency is improved or rapid acceleration is restrained by prompting the vehicle occupant to slowly accelerate the vehicle before reaching of an objective point, the objective point may be set so that the amount of variation of inclination is equal to a predetermined value or more. If the vehicle occupant is prompted to decelerate the vehicle before reaching a sharp turn whose curvature radius is small, the objective point may be a starting point of the turn.

Although the learning status display 41 is displayed only about a learning status in which the learning progress is "Latter half" or "Completion" in the aforementioned embodiment, at least one learning status display 41 among "No deceleration", "Beginning", and "First half" may be displayed, for example, when the amount of information to be displayed on the screen is small.

Although the learning status display 41 in the traveling direction of the host vehicle is highlighted only when learning progress corresponding to the traveling direction is "Completion" in the aforementioned embodiment, the learning status display 41 corresponding to the traveling direction of the host vehicle may be highlighted except when learning progress is "Completion". For example, even if the learning status display 41 is about a learning status in which the learning progress is "First half" and "Latter half", the learning status display 41 may be highlighted if it corresponds to the traveling direction of the host vehicle. At this time, at least, it is only necessary for the learning status display 41 to be displayed in association with the traveling direction of the host vehicle.

Although the learning status display is set to show a point, such as an intersecting point or a diverging point, on a map image in each embodiment mentioned above, the learning status display may be set to show a zone on a map image.

Figure 10:
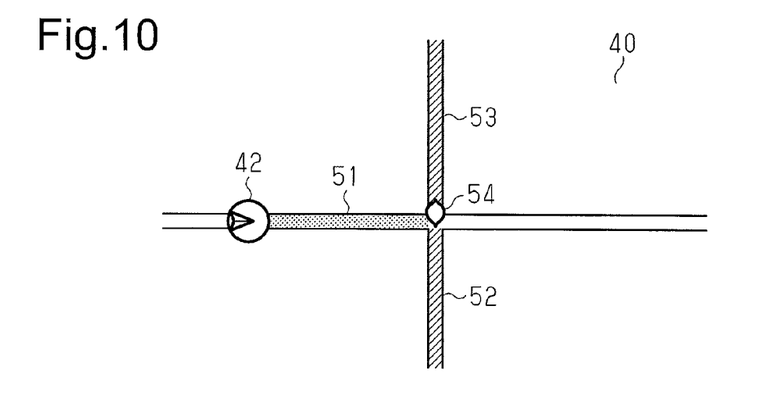
FIG. 10 is a diagram describing a display example of a learning status display performed by a vehicle control device of a modification.

For example, as shown in FIG. 10, an objective point display 54 showing an objective point may be displayed, and learning status displays 51 to 53 showing to-be-learned zones that are connected to the objective point may be displayed on the map image 40. The learning status displays 51 to 53 are route displays each of which shows a route or are belt-shaped displays each of which differs in color or in pattern from a display showing a traffic congestion zone, and the objective point display 54 is set as an exit of the to-be-learned zone, whereas an end on the side opposite to the objective point is set as an entrance. Therefore, it is possible to correlate the traveling direction and the learning status with each other. The learning status displays 51 to 53 differ from each other in color or in pattern in accordance with learning progress. For example, if the learning progress in the traveling direction of the host vehicle has reached predetermined learning progress, it is desirable to highlight the learning status display 51 corresponding to the traveling direction of the vehicle. A change in color, in pattern, or in line thickness can be mentioned as a method for highlighting the display in this case.

Figure 11:
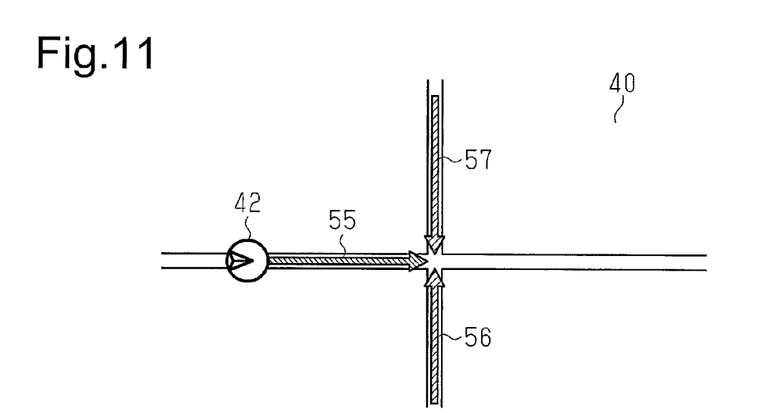
FIG. 11 is a diagram describing a display example of a learning status display performed by a vehicle control device of a modification.

Additionally, as shown in FIG. 11, learning status displays 55 to 57 in which traveling directions facing an objective point are shown by arrow displays may be displayed on the map image 40. As shown in the examples of FIGS. 10 and 11, it is possible for the vehicle occupant to recognize the position of an entrance point by displaying a to-be-learned zone correlated with the traveling direction. It is possible to recognize and comprehend a learning status display corresponding to the traveling direction of the host vehicle.

Although the learning status display is displayed on the two-dimensionally displayed map image 40 in each embodiment mentioned above, the learning status display may be displayed on a base image showing a part of a road.

Figure 12:
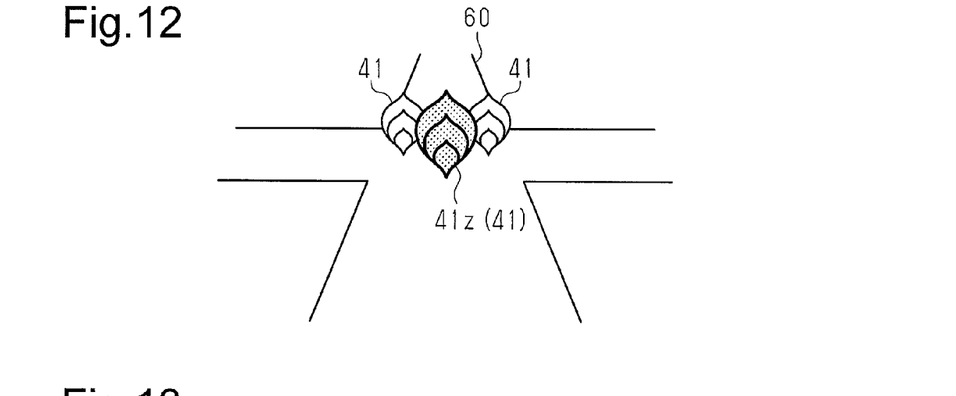
FIG. 12 is a diagram describing a display example of a learning status display performed by a vehicle control device of a modification.

For example, as shown in FIG. 12, the learning status display 41 may be displayed on an overhead road image 60 in which a predetermined zone that is forward in the traveling direction is seen from obliquely upward.

Figure 13:
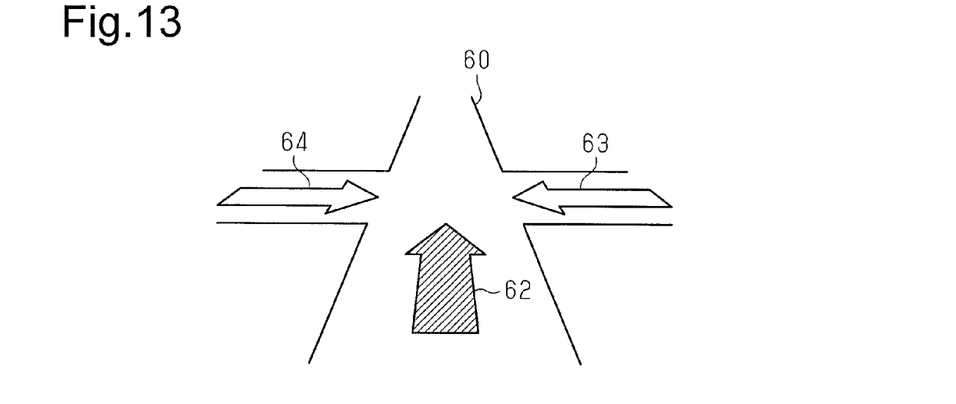
FIG. 13 is a diagram describing a display example of a learning status display performed by a vehicle control device of a modification.

As shown in FIG. 13, learning status displays 62 to 64 showing to-be-learned zones, such as arrow displays, may be displayed on the overhead road image 60.

Figure 14:
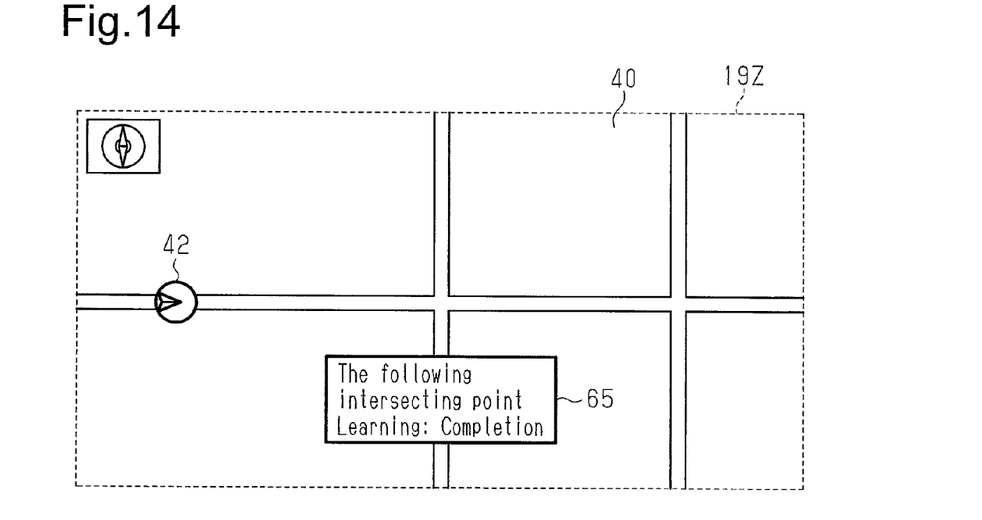
FIG. 14 is a diagram describing a display example of a learning status display performed by a vehicle control device of a modification.

As shown in FIG. 14, it is only necessary for the learning status display to be displayed so that the vehicle occupant can correlate the traveling direction of the vehicle and the learning status with each other, and the learning status display is not necessarily required to be an icon showing a point or to be a belt-shaped display showing a zone. For example, as in a learning status display 65 of FIG. 14, the traveling direction or the learning progress may be shown by characters.

Although a plurality of learning status displays corresponding to different traveling directions, respectively, is displayed in accordance with learning progress in each embodiment mentioned above, only a learning status display corresponding to the traveling direction of the host vehicle may be displayed. At this time, for example, only a learning status display corresponding to the traveling direction of the host vehicle may be displayed without depending on a relative distance between a vehicle position and a to-be-learned zone. Alternatively, if a relative distance between a vehicle position and a to-be-learned zone is greater than a predetermined distance, a plurality of learning status displays may be displayed, and only a learning status display corresponding to the traveling direction of the host vehicle may be displayed when the relative distance therebetween is smaller than the predetermined distance, and learning status displays other than in that case may be brought into a non-display state. According to this configuration, only a learning status display corresponding to the traveling direction of the host vehicle is displayed, for example, even if learning statuses in different traveling directions are correlated with one zone or one point. Therefore, it is possible for the vehicle occupant to easily recognize information on the learning status according to the traveling direction of the host vehicle.

Although driving assistance is performed by cooperation between the navigation device 11 and the ECU 25 in each embodiment mentioned above, the ECU 25 may learn a traveling history, and a learning status display may be displayed on the display 19.

The vehicle control device may be embodied in devices other than the in-vehicle device. For example, it may be a portable information terminal, such as smartphone, that is connected to the in-vehicle network 29. The display 19 may be a display of the portable information terminal connected to the navigation device 11.

A server connected to the navigation device 11 through an external network may set a to-be-learned zone. The server sets the to-be-learned zone in accordance with, for example, the amount of traffic, and transmits information on the position of a to-be-learned zone or information on traveling directions to the navigation device 11. According to this configuration, it is possible to set a to-be-learned zone based on statistical information obtained by the server.

Although the learning progress is determined by use of learning information 35 based on the traveling history of the host vehicle in each embodiment mentioned above, the learning progress may be determined by use of learning information collected from many vehicles by means of a server. In this case, the server includes the traveling history learning section 17, which learns the traveling histories of many vehicles. For example, it is possible for the server to statistically process pieces of learning information transmitted from a plurality of vehicles that have passed through the same zone and to provide the pieces of learning information to the navigation device 11 through, for example, an external network. In this case, it is possible to raise the reliability of learning information.

Although a case has been mentioned in each embodiment mentioned above in which the aforementioned display control is performed when the navigation device 11 performs driving assistance in cooperation with the ECU 25, the aforementioned display control may be applied to a guide display when automatic traveling control is performed.

In each embodiment mentioned above, only a learning status display showing a learning status corresponding to the traveling direction of the host vehicle is displayed, or, alternatively, a learning status display corresponding to the traveling direction of the host vehicle is displayed in a display manner different from a learning status display showing a learning status corresponding to another different traveling direction. However, it is only necessary for a vehicle control device, such as the controller 15 of the navigation device, to be capable of displaying a learning status display showing a learning status corresponding to the traveling direction of the host vehicle, and the display manner is not limited to each display example mentioned above.

The invention claimed is:

1. A vehicle control device comprising:
a display device configured to perform driving assistance to restrain an acceleration of a host vehicle for prompting an occupant of the host vehicle, wherein the display device is configured to provide information to the occupant of the host vehicle;
learned information storage circuitry configured to store a traveling history of the host vehicle;
traveling history learning circuitry configured to store learned information which includes information on deceleration in a to-be-learned zone based on the traveling history of the host vehicle in the learned information storage circuitry in association with a position of the to-be-learned zone and with a traveling direction of the vehicle in the to-be-learned zone, the to-be-learned zone has a predetermined distance to an objective point, with objective points being set at a plurality of points of a road;
learned information obtaining circuitry configured to obtain, from the learned information storage circuitry, learned information corresponding to a position of the host vehicle; and
a display control circuitry configured to display, on the display device, a learning status display showing a learning status determined from the learned information based on the information on deceleration in the to-be-learned zone, the learning status showing a learning progress of the to-be-learned zone, corresponding to the traveling direction of the host vehicle.

2. The vehicle control device according to claim 1, wherein the display control circuitry is configured to display, on the display device, only the learning status display showing the learning status corresponding to the traveling direction of the host vehicle.

3. The vehicle control device according to claim 1, wherein the display control circuitry is configured to display, on the display device, the learning status display corresponding to the traveling direction of the host vehicle in a display manner different from learning status displays showing learning statuses corresponding to other different traveling directions.

4. The vehicle control device according to claim 1, further comprising a learning status determination circuitry configured to determine a learning status of the to-be-learned zone based on the obtained learned information, wherein
the learning status determination circuitry is configured to calculate a frequency of a predetermined traveling state in the to-be-learned zone by use of learned information corresponding to the position and the traveling direction of the host vehicle and to determine learning progress based on the frequency, and the display control circuitry is configured to display the learning status display corresponding to the traveling direction of the host vehicle when the determined learning progress has reached predetermined progress.

5. The vehicle control device according to claim 1, further comprising a route search circuitry configured to search for a route from a departure place to a destination, wherein the learned information obtaining circuitry is configured to obtain learned information on a searched route and in a traveling direction from the departure place toward the destination, and the display control circuitry is configured to display, on the display device, the learning status display of the route retrieved based on the obtained learned information.

6. The vehicle control device according to claim 1, wherein the display control circuitry is configured to display the learning status display corresponding to the traveling direction of the host vehicle under at least one of the condition that i) the host vehicle has entered the to-be-learned zone and the condition that ii) a relative distance between the position of the host vehicle and the to-be-learned zone has become equal to or less than a predetermined distance.

7. The vehicle control device according to claim 1, wherein the display control circuitry is configured to bring the learning status display into a non-display state under the condition that the host vehicle has left the to-be-learned zone.

* * * * *